United States Patent

Dimeff

[11] 4,030,362
[45] June 21, 1977

[54] SELF-CALIBRATING RADIOMETER

[76] Inventor: John Dimeff, 5346 Greenside Drive, San Jose, Calif. 95127

[22] Filed: Dec. 22, 1975

[21] Appl. No.: 643,042

[52] U.S. Cl. .......................................... 73/355 EM
[51] Int. Cl.² .......................................... G01J 5/52
[58] Field of Search ....... 73/190 H, 355 R, 355 EM

[56] References Cited

UNITED STATES PATENTS

| | | | |
|---|---|---|---|
| 2,305,396 | 12/1942 | Volochine | 73/355 R |
| 2,811,856 | 11/1957 | Harrison | 73/355 R |
| 3,131,304 | 4/1964 | Hager, Jr. | 73/355 R X |
| 3,164,021 | 1/1965 | DeJong et al. | 73/355 R |
| 3,564,252 | 2/1971 | Stoft | 73/355 R X |
| 3,599,474 | 8/1971 | Brown et al. | 73/1 F |
| 3,880,522 | 4/1975 | Murray | 73/355 R X |

Primary Examiner—Richard C. Queisser
Assistant Examiner—John S. Appleman
Attorney, Agent, or Firm—Darrell G. Brekke; John R. Manning

[57] ABSTRACT

A self-calibrating radiometer comprising a block having a front surface for receiving incident radiation flux, an identically configured rear surface for receiving internally applied heat and a midportion for thermally insulating the rear surface from the front surface, the front surface being capable of absorbing as heat substantially all radiation flux incident thereupon and capable of reradiating substantially all of the absorbed heat, and the rear surface being capable of radiating substantially all heat applied thereto, a thermocouple configuration for sensing the heat radiated by each of the front and rear surfaces, an indicator for indicating any difference in the sensed heat, a heating element for applying enough heat to the rear surface so that no difference in heat radiated by the front and rear surfaces is indicated by the indicator, and a measuring circuit for measuring the heat applied to the rear surface, such measurement being indicative of the radiant flux incident on the front surface.

2 Claims, 6 Drawing Figures

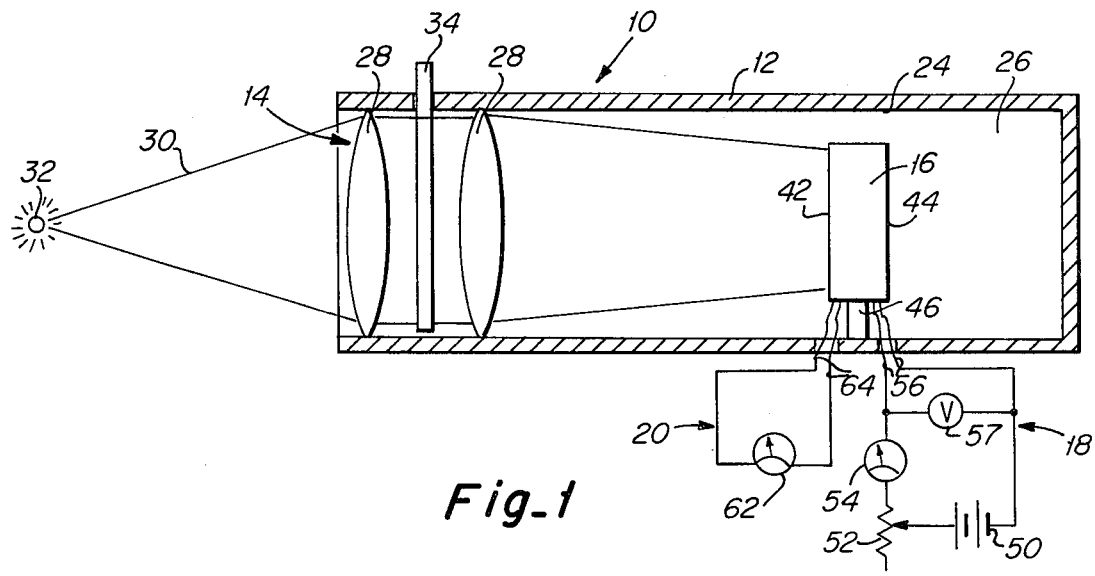
Fig_1
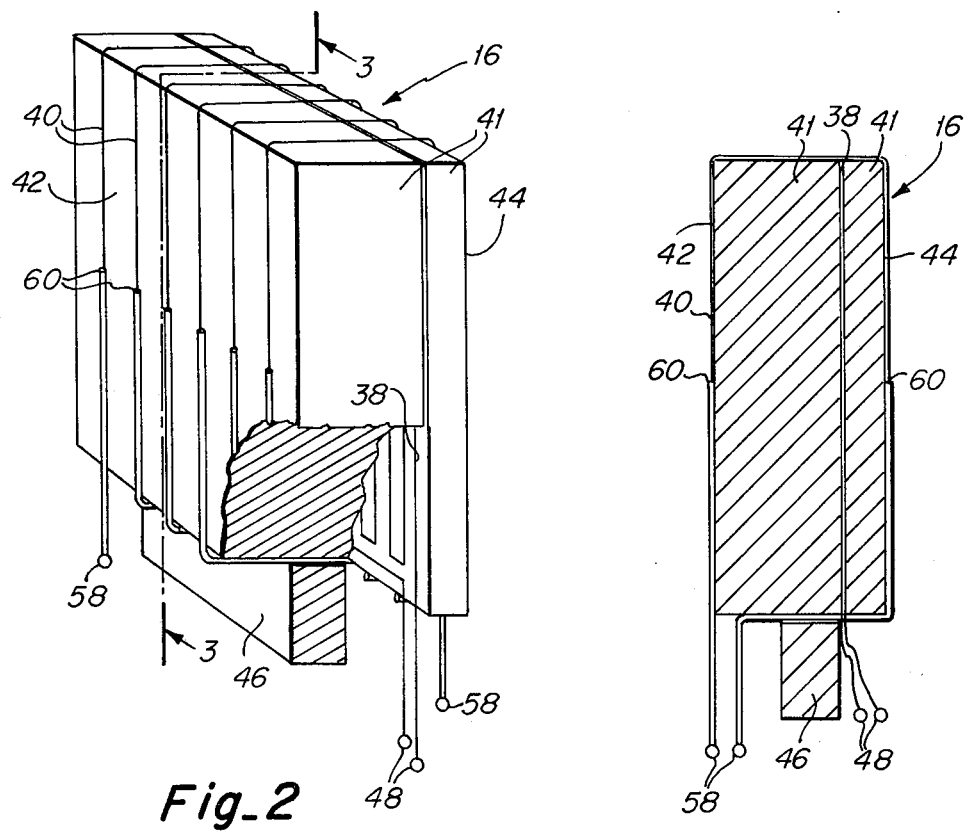
Fig_2
Fig_3

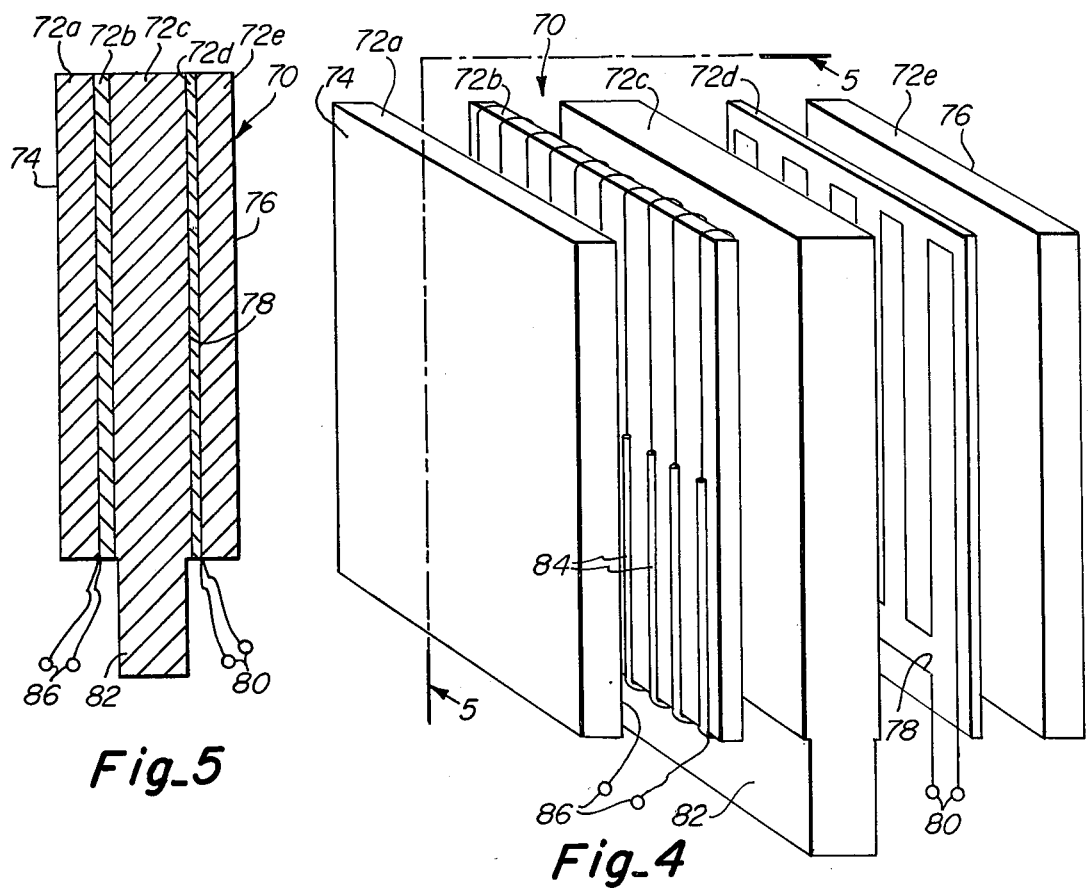
Fig_5
Fig_4
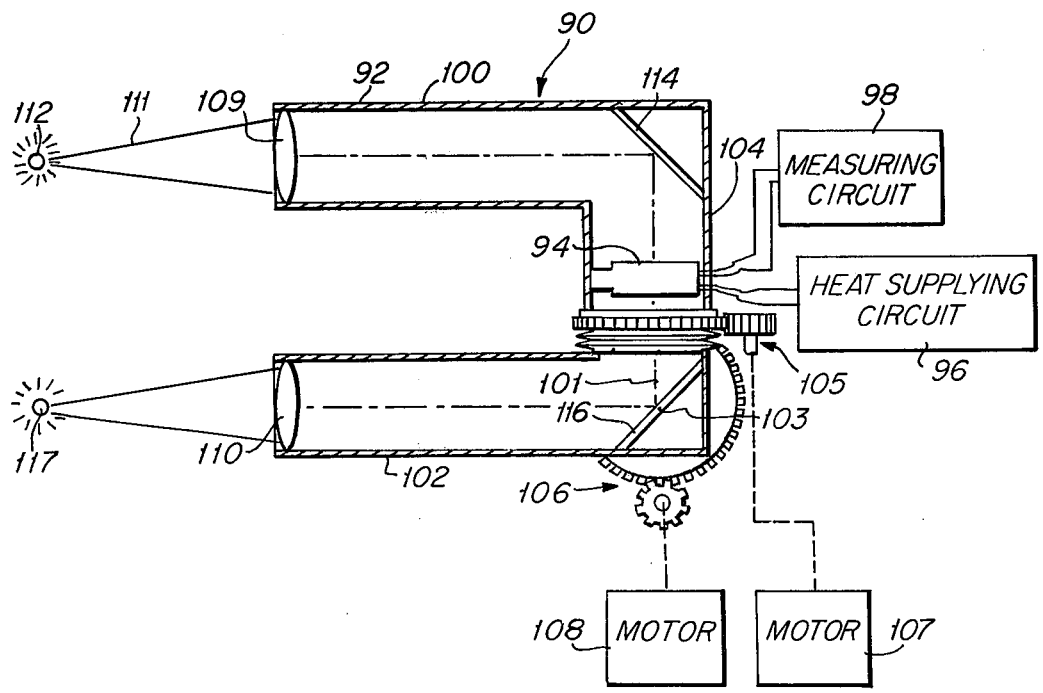
Fig_6

SELF-CALIBRATING RADIOMETER

The invention described herein was made by an employee of the United States Government and may be manufactured and used by or for the Government for Governmental purposes without the payment of any royalties thereon or therefor.

BACKGROUND OF THE INVENTION

1. Field of the Invention

The present invention relates generally to radiation-receiving devices, and more particularly, to a self-calibrating radiometer.

2. Description of the Prior Art

A radiometer is an instrument for measuring radiated flux and is typically used to measure light output from an object, temperature of foundry melts, temperature of stars, etc. A conventional radiometer includes an optical system for collecting energy from a source under examination and for focusing the energy, a temperature-sensing element such as a temperature sensitive resistor or bolometer, for receiving the focused energy and providing an electrical output of its temperature, and an electrical measuring system for providing an indication of the source temperature in response to the electrical output.

Heretofore, one of the disadvantages of such radiometers was that each was required to be calibrated against a "standard" radiating body of known temperature and known surface emissivity. The problem associated with calibrating a radiometer is that of duplicating in the radiometer an equivalent radiation temperature of a high temperature or a distant object. Because of this problem the prior art devices have been unsatisfactory in measuring high-temperature, distant objects, such as stars, etc.

In the prior art radiant energy measuring systems which are disadvantageous in that they require calibration are found in the U.S. Pat. Nos. 2,305,396, Volochine, and 3,566,122, Paine.

Other instruments that are used to measure fundamental properties of heat-producing objects include radiation pyrometers which are used to measure the temperature of the object.

An example of a pyrometer, or temperature-measuring instrument is found in U.S. Pat. No. 3,164,021, DeJong et al. The DeJong device includes a radiation receiver having front and back surfaces and a heating element embedded therein for equalizing the temperature on the front and back surfaces. A differential thermocouple is associated with the radiation receiver and serves to measure the temperature difference between the front and back surface, and a measuring thermocouple is disposed within the windings of the differential thermocouple and serves to measure the absolute temperature of the front surface. In operation, the heating element supplies energy to the device to equalize the temperatures of the front and back surfaces, thereby permitting the temperature of the front surface to be measured. However, this device is disadvantageous in that it must be calibrated and is limited to measuring the temperature of objects whose equivalent radiation temperature can be conveniently duplicated in the measuring instrument.

SUMMARY OF THE PRESENT INVENTION

It is a primary object of the present invention to provide a self-calibrating radiometer.

Another object of the present invention is to provide a radiation flux measuring device which includes a radiation receiver having a radiation-receiving surface that does not have to be raised to the temperature of a heat-emitting source.

Briefly, the preferred embodiment includes a block having a front surface for receiving incident radiation flux, an identically configured rear surface for receiving internally applied heat and a midportion for thermally insulating the rear surface from the front surface, the front surface being capable of absorbing as heat substantially all radiation flux incident thereupon and capable of reradiating substantially all of the absorbed heat, and the rear surface being capable of radiating substantially all heat applied thereto, a thermocouple configuration for sensing the heat radiated by each of the front and rear surfaces, an indicator for indicating any difference in the sensed heat, a heating element for applying enough heat to the rear surface so that no difference in heat radiated by the front and rear surfaces is indicated by the indicator, and a measuring circuit for measuring the heat applied to the rear surface, such measurement being indicative of the radiant flux incident on the front surface.

An advantage of the present invention is that the radiometer is self-calibrating.

Another advantage of the present invention is that it does not have to have its temperature raised to the temperature of the source being examined.

These and other objects and advantages of the present invention will no doubt become apparent following a reading of the following detailed description of the preferred embodiments which are illustrated in the several figures in the drawing.

IN THE DRAWING

FIG. 1 is a schematic diagram generally illustrating a radiometer in accordance with the present invention;

FIG. 2 is a perspective view of a radiation receiver with portions broken away for clarity;

FIG. 3 is a cross-sectional view taken through the lines 3—3 of FIG. 2;

FIG. 4 is an exploded view of an alternative embodiment of a radiation receiver;

FIG. 5 is a cross-sectional view taken through the lines 5—5 of FIG. 4; and

FIG. 6 is an alternative embodiment of a radiometer in accordance with the present invention.

DESCRIPTION OF THE PREFERRED EMBODIMENT

Referring now to FIG. 1 of the drawing, there is shown a schematic diagram of a radiometer 10 including a housing 12, a focusing lens system 14, a radiation receiver 16, a heat-supplying circuit 18, and a measuring circuit 20.

The housing 12 is comprised of an elongated tube having an open end and having an internal surface 24 so as to form a cylindrical cavity 26 therewithin. The surface 24 is coated so as to provide a black surface which serves to absorb heat, e.g., to absorb a significant fraction of the radiation at a wavelength corresponding to the temperature at which maximum radiant energy exchange occurs between the surface 24 and the radiation receiver 16, and is backed by a conductive material to maintain the surface 24 at a substantially uniform temperature when radiation is focused through the open end into the cavity. The cavity 26 serves to reduce convection circulation transfering heat from the external environment to the radiation receiver 16 and may be evacuated if further reduction is desired.

The focusing lens system 14 is mounted in a covering relationship over the open end of the housing 12 and includes one or more lenses 28 for focusing radiation flux, illustrated generally by the numeral 30, into the cavity 26. The radiation flux 30 is emitted from a source 32, such as a distant star. Typically, the radiation flux 30 is contained within a narrow band of wavelengths in the infrared region of the electromagnetic spectrum. In the preferred embodiment, a transmission filter 34 having a narrow band pass characteristic matched to the band of the radiation flux 30 is inserted between the lens 28. The filter 34 serves to transmit only the radiation flux falling within the narrow band into the cavity 26, thereby preventing ambient light from affecting the radiometer 10, and further preventing energy from receiver 16 from escaping.

Referring also to FIGS. 2 and 3, the radiation receiver 16 includes a heating element 38 and a differential thermocouple 40. The receiver 16 is in the shape of a block or parallelopiped having laminations 41 formed from phenolic material and includes identically-configured parallel front and rear surfaces 42 and 44, respectively, and a bottom support 46. The surfaces 42 and 44 are comprised of identical black coatings which are as close to a perfect black radiation surface as can be conveniently obtained. The front surface 42 serves to absorb as heat substantially all the radiation flux incident upon it and to reradiate heat therefrom and to pass heat into the receiver 16. The rear surface 44 serves to radiate substantially all heat that is supplied to it through the receiver 16. The support 46 is formed from an insulating material, such as a phenolic, and depends from the bottom of the receiver 16 at a point near the rear of the front lamination 41 which lies in a plane at the thermal center relative to the temperatures of the front surface 42 and the heating element 38. The support 46 serves to mount the receiver 16 to the internal surface 24 with the surfaces 42 and 44 aligned perpendicular to the axis of the housing 12 and to conduct heat from the radiation receiver 16 to the housing 12. Since the support 46 is disposed at the thermal center of the receiver 16, the quantity of heat emanating from the front surface 42 which passes through the support is equal to that emanating from the heating element 38.

The heating element 38 includes a length of flat resistance wire of a preselected resistance formed into a plurality of adjacent loops and having terminals 48. The element 38 is affixed as by bonding, to a surface of the lamination 41 near the rear surface 44. In the preferred embodiment the element 38 is formed from constantan material. When electrical current is passed through the element 38, it converts the current into heat, which is absorbed by the receiver 16 and passed to the rear surface 44.

The heat supplying circuit 18 includes a regulated DC power supply 50 for providing a constant voltage on its output, a variable resistor 52 for selectively varying the current passing therethrough, and an ammeter 54 connected in series. Conductors 56 connect the heating circuit 18 to the terminals 48. A voltmeter 57 is connected across the conductors 56 and serves to measure the voltage applied to the heating element 38. By varying the resistance of the resistor 52, the current conducted to the heating element 38 by conductors 56 is controlled. The power transmitted by the heating element 38 can be calculated from the square of the voltage measured by voltmeter 57 divided by the resistance of the element 38. The heat flux transferred by the element 38 can then be determined by dividing the power by the cross-sectional area of the radiation receiver 16.

The thermocouple 40 includes a length of flat constantan wire helically wrapped around the radiation receiver 16 contiguous with the surfaces 42 and 44, and having terminals 58. As shown, the bottom half of the wire is covered with copper so as to form thermocouple junctions 60 at the boundaries of the dissimilar metals midway between the top and bottom edges of the respective front and rear surfaces 42 and 44. Accordingly, the junctions 60 at the front and rear surfaces are connected in a series circuit. The wire may be covered with copper by dipping the radiation receiver 16 (having the constantan wire wrapping, into a copper bath and then selectively etching away the copper that covers the receiver. The thermocouple 40 serves to sense the temperatures of the surfaces 42 and 44 which corresponds to the heat radiated by the surfaces 42 and 44, and to provide a current indicative of any difference therebetween.

The measuring circuit 20 includes an ammeter 62, or galvanometer, connected by conductors 64 to the terminals 58 and serves to measure the current flowing between the front and rear junctions 60. When no current flows through the ammeter 62 the temperature difference between the front and rear junctions 60 is zero. Accordingly, the temperature of the front surface 42 is equal to the temperature of the rear surface 44.

In operation, the housing 10 is disposed with its open end facing the source 32 whose radiant energy output is to be measured and the lens 28 is adjusted to focus the radiation flux 30 directly onto the front surface 42, thereby isolating the rear surface 44 from the radiation flux. The filter 34 serves to transmit only radiation occurring at the wavelength of the radiation flux of interest, thereby largely preventing ambient light from entering the cavity 26. The radiation flux 30 impinging on the black surface 42 is absorbed within the radiation receiver 16 causing its temperature to increase. As a result of the increase in temperature, the receiver 16 loses energy by convection and by radiation from the front and rear surfaces 42 and 44, respectively, and by conduction through the support 46.

The temperature of the receiver 16 would normally rise to an equilibrium level corresponding to the temperature at which the incident radiant energy is equal to the energy lost by convection and radiation from the surfaces 42 and 44, and by conduction through the support 46. However, in accordance with this invention the normal pattern for reaching equilibrium is disturbed by introducing heat into the receiver 16 through the heating element 38. In particular, the heating element 38 is energized by the heat supplying circuit 18 to supply enough heat to the rear surface 44 so that the net heat transfer through the radiation receiver is zero.

In order to provide zero net heat transfer, substantially all energy received at the front surface 42 is dissipated by radiation from that surface and an equal amount of heat energy applied by the heating element 38 to the rear surface 44 is dissipated by radiation from that surface 44. It should be noted that some heat energy is lost by convection from the front and rear surfaces but because of symmetry, the convection loses are equal. In addition, a small heat loss occurs by conduction through the support 46. Since the support 46 extends from a point on the bottom surface of the receiver 16 which lies at the thermal center between the front surface 42 and the heating element 38, the conductive heat loss through the support 46 is contributed to in equal portions by the incident radiation flux and by the heat flowing forwardly from the element 38.

When the heat dissipated at front surface 42 is equal to that dissipated at the rear surface 44, the net heat transfer through the radiation receiver 16 is zero. Accordingly, it follows that the temperature of the front surface 42 is equal to the temperature of the rear surface 44. The thermocouple 40 responds to the temperature differences between the front and rear surfaces and provides a current in the conductor 64 corresponding to the temperature differential. The level of current flowing through the conductor 64 is indicated by the ammeter 62. Hence, when the temperatures of the front and rear surfaces are equal, the ammeter 62 indicates a null, or zero current.

In summary, since no net heat transfer occurs through the radiation receiver 16, all heat entering the front surface 42 is lost from that surface and all heat entering the rear surface 44 is lost from that surface. By virtue of the equality of temperatures of the surfaces 42 and 44, and because of the symmetry of the physical characteristics and environment of those surfaces, the surfaces thus lose equal amounts of energy. Accordingly, the energy entering the receiver as radiation flux is equal to the energy supplied to the receiver by the heat supplying circuit 18 through the heating element 38, which energy can be calculated from the indications of the ammeter 54 and voltmeter 57.

Referring also to FIGS. 4 and 5, and alternative embodiment of the present invention is illustrated. As shown, a radiation receiver 70 comprises five phenolic laminations 72 a–e and has a front surface 74 and a rear surface 76. A heating element 78 comprising a length of flat wound constantan wire and having terminals 80 is bonded to the lamination 72d and serves to provide known quantities of heat to the receiver 70. The central lamination 72c includes a downwardly depending support 82 for mounting the receiver to a housing (not shown). The fundamental difference in this embodiment is that a differential thermocouple 84 is wrapped around a lamination 72b near the front lamination so as to be embedded within the receiver 70. The terminals 86 of the thermocouple are coupled to an ammeter or external current indicating instrument (not shown). The thermocouple 84 serves to sense the heat flow within the receiver 70 and to provide a current indicative of the heat flow. By introducing a quantity of heat through the heating element 78 a condition can be achieved where no current flows through the thermocouple 84. When this condition occurs, there is a zero net heat flow through the lamination 72b and as described previously, the incident radiation flux can be determined.

A third embodiment of the present invention is schematically illustrated in FIG. 6. As shown a radiometer 90 comprises a housing 92, a radiation receiver 94, a heat supplying circuit 96 and a measuring circuit 98. The fundamental difference in this embodiment is that the housing 92 includes an input tubular portion 100, an output tubular portion 102 disposed parallel to the portion 100, and a central tubular portion 104 interconnecting the portions 100 and 102. The portion 104 includes adjacent sections which are gimbal mounted to enable rotation about the intersecting axes 101 and 103. Control about these axes is schematically illustrated by the drive mechanisms 105 and 106 and the associated drive motors 107 and 108. The distal ends of the portions 100 and 102 are open and include focusing lens 109 and 110, respectively. The portion 100 and lens 109 are disposed to receive the radiation flux 111 from an object 112 and to focus the flux on a mirror 114 disposed in the housing 92 at the intersection of the portions 100 and 104. The mirror 114 serves to reflect the flux on the front surface of the radiation receiver 94. In this embodiment, flux is transmitted to the rear surface of the receiver 94 from an external source 117 via the lens 110 and a mirror 116. Consequently, this embodiment allows direct measurement of the differences in the radiation fluxs emanating from sources 112 and 117 which may be moving relative to each other.

Although the present invention has been described above in terms of several embodiments, it will be appreciated that various alterations and modifications thereof will become apparent to those skilled in the art after having read the preceding disclosure. Accordingly, it is intended that the following claims be interpreted as including all such alterations and modifications as fall within the true spirit and scope of the invention.

What is claimed is:

1. A self-calibrating radiometer comprising:
   first means forming a block having a front surface for receiving incident radiation flux, an identically configured rear surface for receiving internally applied heat and a mid portion for thermally insulating said rear surface from said front surface, said front surface being capable of absorbing as heat substantially all radiation flux incident thereupon and capable of reradiating substantially all of the absorbed heat, and said rear surface being capable of radiating substantially all heat applied thereto;
   second means for sensing the heat radiated by each of said front and rear surfaces and for indicating any difference therebetween;
   third means for applying enough heat to said rear surface so that no difference in heat radiated by said front and rear surfaces is indicated by said second means;
   fourth means for measuring the heat applied to said rear surface, such measurement being indicative of the radiant flux incident on said front surface;
   fifth means for focusing first radiation flux from a first external source upon said front surface;
   sixth means for focusing second radiation flux from a second external source upon said rear surface; and
   housing means enclosing said block and isolating said rear surface from said first external flux and isolating said front surface from said second external flux.

2. A self-calibrating radiometer as recited in claim 1 wherein said housing includes gimbaled portions and further comprising means for relatively moving said gimbaled portions.

* * * * *